Feb. 22, 1944.  H. FEIGE  2,342,393
AUTOMATIC DISCHARGE MECHANISM FOR SWINGING TRAY OVENS
Filed May 3, 1941  2 Sheets-Sheet 1

INVENTOR
HARRY FEIGE
BY George B. Wilbox
ATTORNEY

Patented Feb. 22, 1944

2,342,393

UNITED STATES PATENT OFFICE 2,342,393

AUTOMATIC DISCHARGE MECHANISM FOR SWINGING TRAY OVENS

Harry Feige, Saginaw, Mich., assignor to Baker Perkins Inc., Saginaw, Mich., a corporation of New York Application May 3, 1941, Serial No. 391,730

6 Claims. (Cl. 198—155)

This invention relates to traveling bake ovens in which trays are pivotally suspended from conveyor chains, and has for its object the provision of an improved automatic mechanism for discharging pans of baked loaves from the trays. Automatic unloading of swinging tray ovens of this kind has not heretofore been satisfactory, in contrast to the automatic unloading of traveling hearth or plate ovens. In an oven of the latter kind, in which the plate conveyor extends to or out of the door of the oven chamber it is a simple matter to provide a receiving chute resting upon the plates of the hearth at the point where they incline downwardly to the end sprockets of the conveyor. Should gravity alone not disengage the pan sets from the conveyor, the movement of the conveyor positively pushes each set of pans onto the discharge chute and thence onto a laterally extending pan chute or conveyor. The problem is simplified further by the fact that loading and unloading take place at separate stations at opposite ends of the oven.

In a swinging tray oven, on the other hand, the conveyor travels at all times within the oven chamber and unless the trays are to travel idle for their final run they must be unloaded at or close to the loading door. Consequently limited space is available for discharge chutes and conveyors to carry the loaves out of the oven and automatic discharging apparatus must operate positively within a short space of conveyor travel. Also, because of the said space limitations the chute or conveyor to carry the pans out of the oven is preferably just wide enough to accommodate the largest pan sets to be used. Also, because the trays are free-swinging and successive pan sets are on separate trays the movement of the conveyor can not be used to push the pans from it, as is possible in plate ovens.

In view of the foregoing mechanical and structural factors it is important in discharging sets of pans from a swinging tray of an oven that the pans shall reach the receiving conveyor simultaneously and in their original alignment. When heretofore it was attempted to discharge trays by tilting them gradually past the angle of repose of the pans it was found that the pan sets very seldom had uniform coefficients of friction at all points over their bottoms. Because pans become dented or warped in use, and charred scale collects irregularly on pans one spot in a set would adhere to the tray more firmly than another and as the tray was gradually inclined toward its fully tilted position one side of the pan set would begin to slide before the other, so that the set turned about the adherent spot. When the pan was freed completely from the tray it would slide down the receiving chute at an angle to its companion set or sets and come to rest diagonally on the transverse conveyor or chute, resulting in jamming of the pans within the oven where the jam can not be seen or cleared readily.

In the usual practice loaves are baked in sets of pans strapped together side by side. Two or more sets may be placed end-to-end on each oven tray, with the pans lengthwise thereof or the sets may be placed side by side as shown in the drawing. In either case it is necessary that the pans on each tray shall be loosened from it at the same instant, so that the relative alignment of the sets will be preserved and they will reach the receiving conveyor simultaneously. If one set lags slightly behind the others it is likely to reach the transfer conveyor in overlapping relation to an adjacent pan set from the same oven tray, causing stoppage and a pile-up of pans from subsequent trays.

The attempt has previously been made to unload swinging tray oven conveyors by tilting the trays by engagement with a stationary member or stop as they travel past the desired discharge point, in the manner of many well known devices for discharging buckets or skips suspended from chain conveyors. However, due to the slow travel of the oven conveyor and the resulting gradual tilting of the trays, uneven adhesion of the pan bottoms of several sets on the same tray will cause one set to start to slide before the other, or cause it to assume a diagonal position, with the results described. For this reason none of the conventional bucket tray-dumping mechanisms referred to have been successfully applied to tray ovens, and to the time of my invention all ovens of this kind have been unloaded manually.

It has been the object of my invention to overcome these difficulties and provide a simple and reliable automatic tray-discharge mechanism for tray ovens.

With the foregoing object in view and others as will hereinafter appear the invention consists of the provision of a power-actuated mechanism for positively tilting each tray at the discharge station suddenly and forcefully, said mechanism timed to the travel of the conveyor, whereby the tray is moved forcefully to its fully tilted position so that the pans thereon are jolted or even tossed a little from the trays. All pans or sets of pans on the tray are thus freed from it at the same instant, start to slide together, and reach the transverse conveyor or chute simultaneously and in their original alignment.

The invention also comprises preferred specific mechanism for effecting the forcible tilting of the trays.

Referring to the drawings.

The drawings are to be understood to be illustrative of the invention and not restricted to details of the particular mechanical elements shown.

Figure 2:
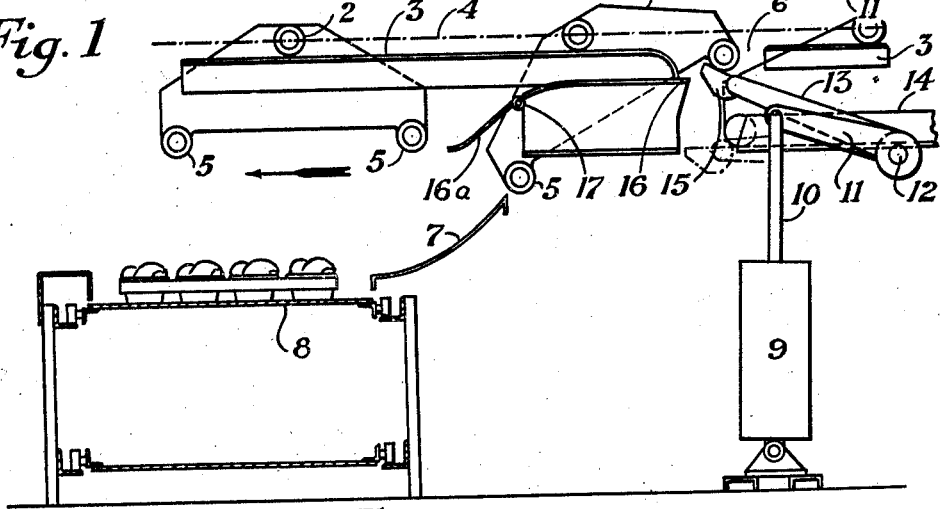
Fig. 2 is a side elevation, partly in section, of the apparatus of Fig. 1.

The conveyor mechanism shown is of conventional construction, comprising swinging trays 1 pivotally suspended from idling rollers 2 which travel on rails 3 carried by the oven frame (not shown) at either side of the conveyor. Along each side of the conveyor a sprocket chain 4 of the usual kind, (indicated by the broken line in Fig. 2) pivotally attached to the trays at the axes of rollers 2, carries the trays along the rails 3 to the left in the drawings, around the end sprockets (not shown) and upwardly past the usual loading door (not shown). The trays 1 are provided at each lower corner with guide or steadying rollers 5.

At the discharge station the rails 3 are interrupted at 6 to permit tilting the trays to a substantial angle. In the case of narrower trays, or trays suspended farther below their rollers 2, the necessary angle of inclination may be attained without breaking the rails 3, at 6. A chute 7 is positioned appropriately to receive pans of baked loaves sliding from the tilted trays. At the lower end of chute 7 a transfer or unloading conveyor 8 is provided to carry the pans laterally out of the oven. The conveyor is not an essential part of the structure in all instances, as in certain plants an inclined chute can be used in its place to carry the goods out of the oven, perhaps down to a lower floor.

To insure that the pans shall be forcefully jarred from their places on the tray and simultaneously start to slide therefrom down the chute 7 to conveyor 8, a novel power-actuated mechanism is provided to engage and quickly lift the rearward edge of each tray 1 as it reaches the discharge station. The power source may conveniently consist of a hydraulic device indicated diagrammatically at 9 in Fig. 2 of the kind known by the trade name "Thrustor." This known device consists of a motor-driven pump and suitable ports and valving housed in a cylinder, operable to produce a fluid flow within the cylinder and move a piston, the stroke of which is transmitted to a piston rod, as 10 of the "Thrustor" 9 in Fig. 2. When the Thrustor is energized by closing its power circuit the piston rod 10 is moved rapidly upward. A solenoid or pneumatic cylinder can also be used for this purpose. The push rod 10 of the Thrustor is pivotally connected to a lever arm 11, which is fixed to a rock-shaft 12 extending across the conveyor.

At either end of the shaft 12 a lever arm 13 is provided, located at one side of the guide channels 14 which engage the guide rollers 5 to steady the trays before and after discharge. Lever arms 13 are provided at their outer ends with small track segments or pads 15, and are indexed on shaft 12 so that when the Thrustor is in its inoperative position, indicated by broken lines in Fig. 2, the pad 15 lies level with and forms a continuation of the lower flange of the guide angle 14. The length of the lever arms and the stroke of the motor 9 are so selected and adjusted that on each working stroke the track segment 15 and the idler roller 5 will be raised sufficiently to tilt the trays to the angle necessary for discharge of the pans.

In order to hold the trays tilted for a few moments and to ease them back to level position so that they will not oscillate before coming to rest, elevated guide rails 16 (see Fig. 2) receive the raised rollers 5 of the tilted tray as they travel from the pads 15. At their rearward ends (taken in the direction of conveyor travel) the guide tracks 16 slope downwardly and are provided with curved inclined end segments 16a to guide the descending guide rollers of each emptied tray and steady it as it regains level position.

In order not to interfere with this mode of use the track segments 16a are pivoted at 17 to the upper sections 16 so that when the trays travel horizontally past the unloading station the guide rollers 5 can pass freely beneath the pivoted sections, lifting them and letting them fall. The pads 15 on levers 13 lie in the gaps in guide angles 14, flush with their lower flanges.

Figure 1:
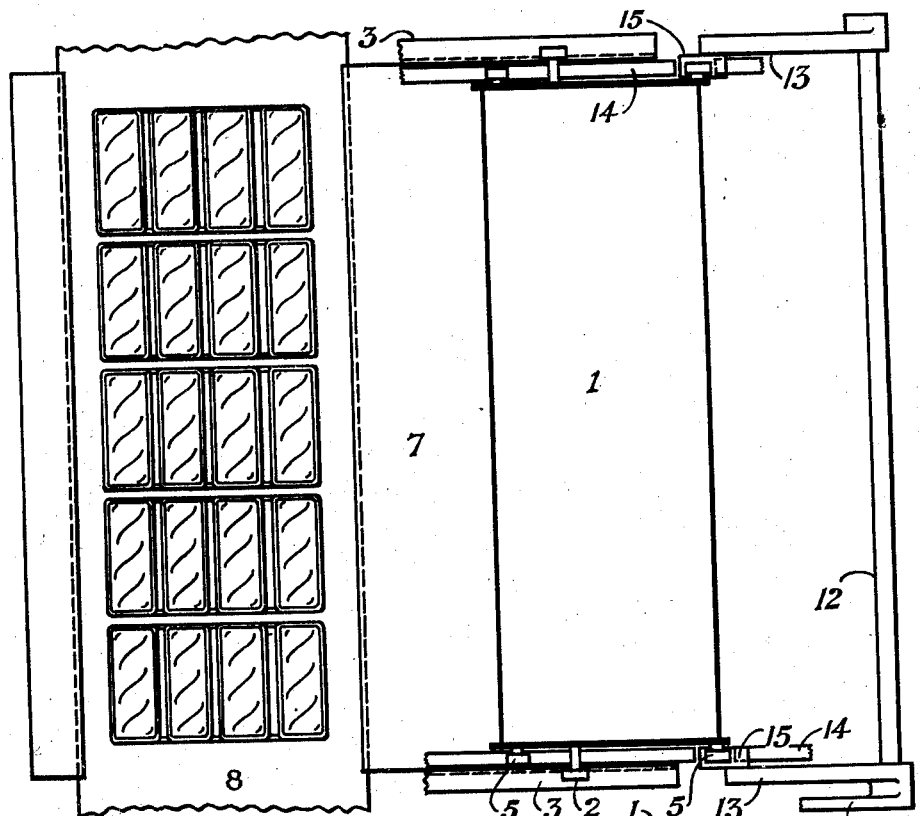
Fig. 1 is a diagrammatic plan view of a portion of a swinging-tray oven conveyor equipped with discharging apparatus according to the invention.
Figure 3:
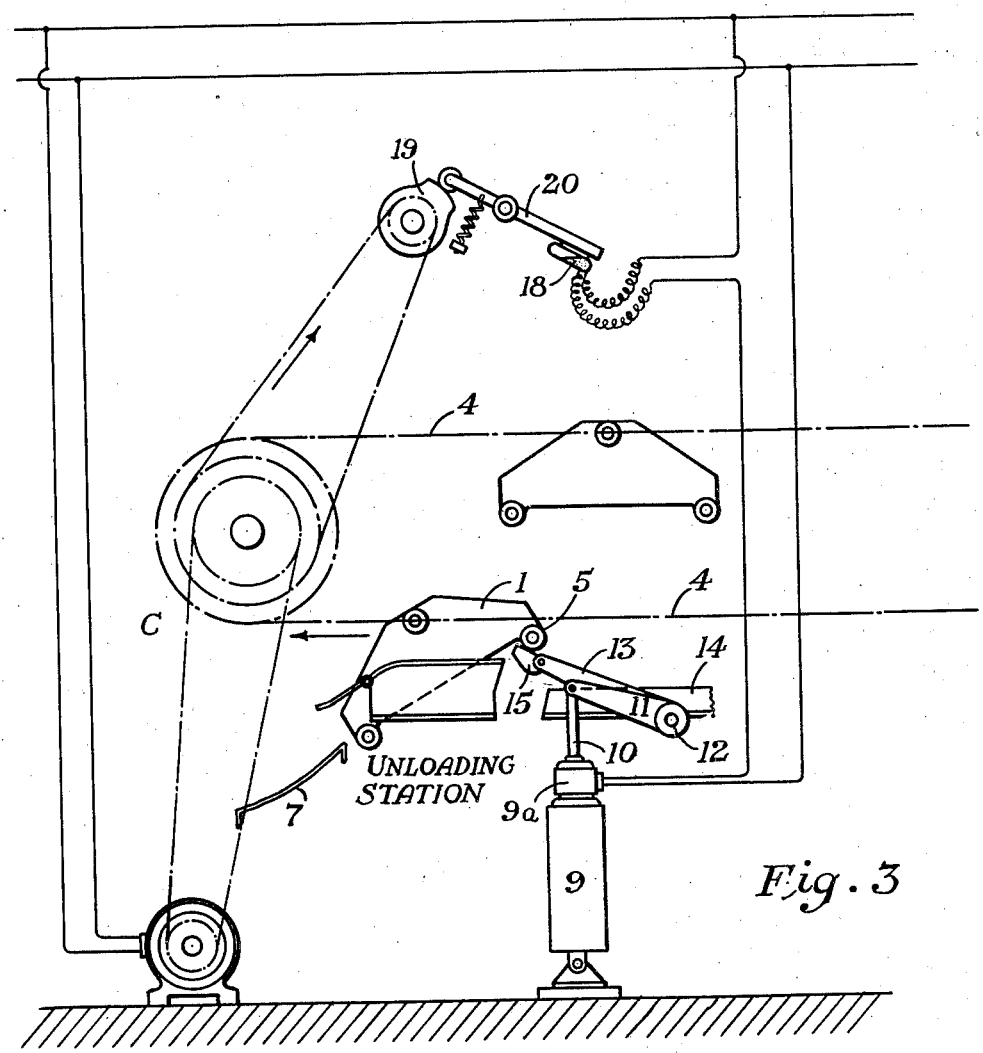
Fig. 3 is a diagrammatic view showing the operating relationship between the conveyor, the tray-tilting Thrustor jack and the timer for actuating the jack according to the arrival of trays at an unloading station.

The operation of the invention is as follows:

Trays 1 with baked loaves in sets of pans strapped together travel from the right in the drawings until their rear guide rollers 5 reach the pads 15 on levers 13. The Thrustor 9, is actuated in timed relation to the travel of the conveyor trays across the unloading station by known switch mechanism, of any suitable design but which preferably comprises a light switch 18, Fig. 3, arranged to be closed at regular intervals by a cam 19 and lever 20 driven by the conveyor drive mechanism C substantially as shown at 11 and 10 in Fig. 1 of my patent No. 1,815,555, issued July 21, 1931, and described on page 2, lines 35-45 of that specification. The Thrustor lifts the pads 15 quickly and forcefully to the position indicated. The upward stroke is preferably arrested suddenly so that the rear edge of each tray is tossed slightly to drop back against the pads 15 with a slight jar. The static friction of the loaded pans on the trays thus being overcome, all parts of each and every set of pans start to slide from the tilted tray 1 down the chute 7 onto the conveyor 8. Since they reach the conveyor 8 simultaneously in the same relative alignment which they had on the trays, the pan sets are prevented from overlapping one another on the conveyor and therefore can not be jammed between the side rails of the conveyor 8.

The invention thus insures the positive and uninterrupted removal of the pans from the oven. With a large tray oven the rate of output may be increased over that previously possible, since the man or men at the loading station need only place fresh pans of unbaked loaves on the trays and need not both unload the baked loaves and reload the tray in the relatively short interval during which the tray is moving past the unloading opening. Labor is saved and the handling of hot pans is made unnecessary. If the conveyor is driven intermittently so that each tray pauses at the loading station, the period of dwell may be reduced to the time needed for loading the tray. The hourly capacity of the oven may therefore be increased, provided raising the temperature and shortening the baking period will not adversely affect the quality of the goods.

The form of my invention herein shown and described is a preferred example of the same, and various changes in the shape and arrangement of parts may be resorted to without departing from the scope of the appended claims.

The term "pans of baked goods" as used herein is to be understood to include also other articles or containers of goods processed, or merely transported on a tray conveyor of the kind herein described.

Having thus fully described my invention, what I claim and desire to secure by Letters Patent is:

1. In an oven having swinging trays pivotally suspended from conveyor chains and having power means for driving said chains, in combination, automatic tray-discharging mechanism comprising a receiving chute beneath a run of said conveyor leading downwardly, its upper edge being positioned to receive pans of baked goods from the trays in tilted position as they traverse an unloading station; tray-tilting means for engaging and lifting one side of each tray at the unloading station; a power device for actuating the tray-tilting means in addition to the power device and to drive the chains and operable in timed relation to the travel of said conveyor to tilt said tray abruptly past the angle of repose of the pans, whereby said pans are caused to slide simultaneously therefrom onto said chute in the same relative positions and alignment as on said tray.

2. Apparatus as claimed in claim 1 wherein conveyor means extending transversely of the conveyor run is positioned at the bottom of said receiving chute to carry pans of baked goods laterally away from the oven.

3. Apparatus for discharging swing trays of a power driven traveling oven conveyor comprising means for engaging each tray as it reaches an unloading station and for tilting said tray quickly beyond the angle of repose of pans thereon with abruptness sufficient to jolt the pans into motion so that all of said pans start to slide from said tray at the same instant in the same relative positions and alignment as on said tray; said tray-engaging and tilting means being actuated by a power device operable independently of the power device used to drive the conveyor and also being operable in timed relation to the travel of said conveyor.

4. Automatic tray-discharging mechanism for an oven having power drive means and swinging trays pivotally suspended from conveyor chains, comprising means adapted to engage each tray and tilt the same at an unloading station located in a run of the conveyor; power means for actuating said tilting means independently of the power drive means of the conveyor; said tilting means being operable in timed relation with the rate of passage of trays past said station, and being adapted to tilt each tray abruptly past the angle of repose of pans thereon, whereby said pans are caused to slide simultaneously therefrom in the same relative positions and alignment as on said tray.

5. In a tray conveyor of the class described having power means for effecting continuous travel of the trays, and also having a chute to receive pans discharged from trays that are tilted at an unloading station; improved pan-unloading mechanism comprising, in combination, tray-tilting means adapted to engage said trays at said station and to tilt them abruptly in regular order; said tilting means being actuated by power means operative independently of the said power means for conveyor travel; and a timing device controlled by the conveyor and adapted to cause said tray-tilting means to operate while each tray to be unloaded is traversing the said unloading station.

6. Automatic tray-discharging mechanism for an oven having swinging trays pivotally suspended from conveyor chains, a power device adapted to drive said conveyor; a receiving chute leading downwardly from an unloading station in the path of conveyor travel, the upper edge of the chute being positioned to receive pans of goods from the trays while the trays are in tilted position and traversing the unloading station; said tray-discharging mechanism comprising power actuated tray-tilting means adapted to engage and lift a side of each tray at the unloading station to tilt said tray abruptly past the angle of repose of the pans, whereby said pans are caused to slide simultaneously therefrom onto said chute in the same relative positions and alignment as on said tray; a power device for said tray tilting means; and control means associated with said power actuated tray-tilting means and causing the tilting of the trays to occur in timed relation to the movement of trays past the unloading station.

HARRY FEIGE.